May 7, 1968
A. G. BAROWS
3,381,795
TWO-STAGE AUGER ELEVATOR
Filed Oct. 31, 1966
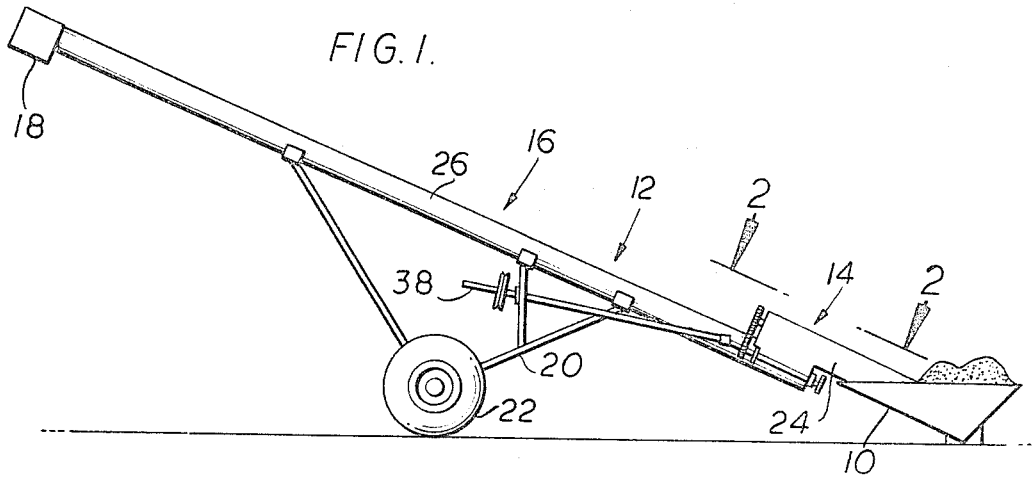
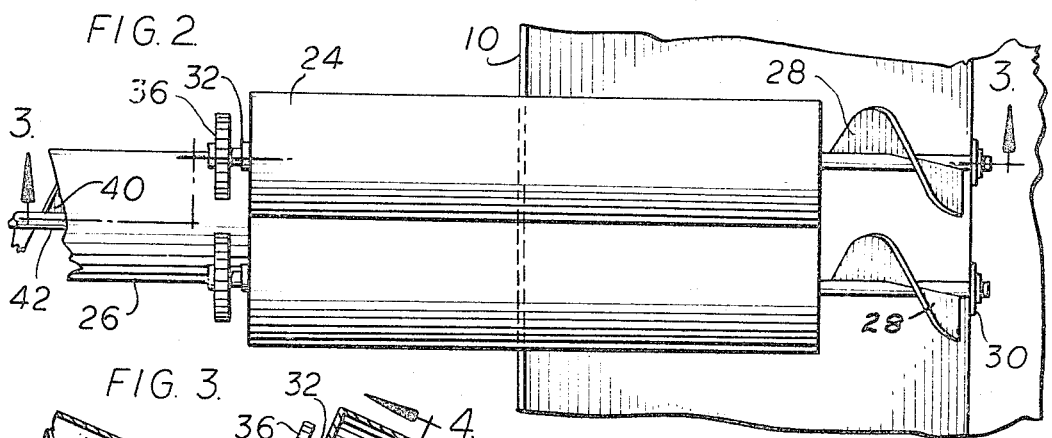
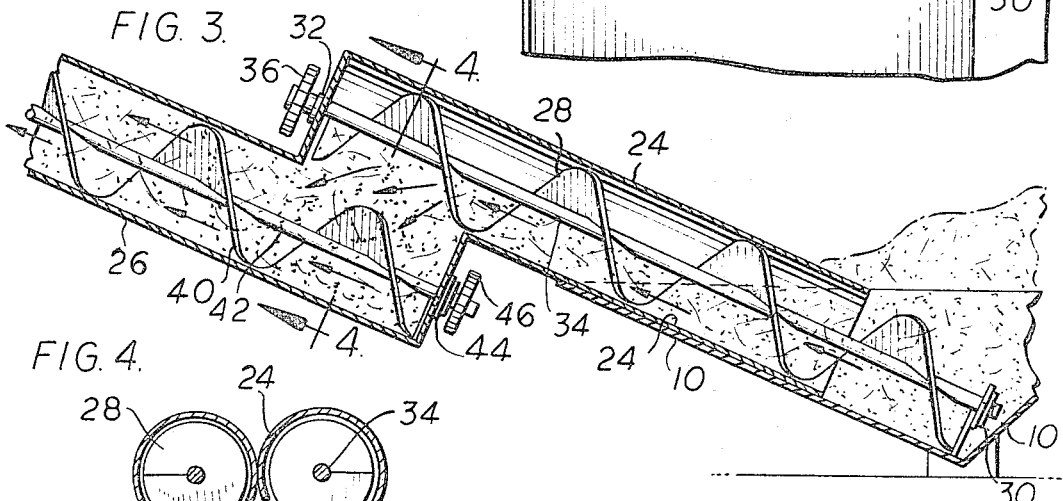
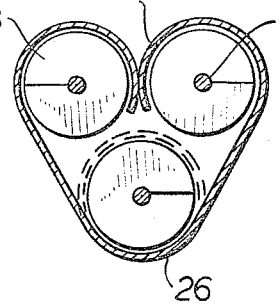
INVENTOR
ARTHUR G. BAROWS
Julian Schechner
ATTY

United States Patent Office 3,381,795
Patented May 7, 1968

3,381,795
TWO-STAGE AUGER ELEVATOR
Arthur G. Barows, Downers Grove, Ill., assignor to International Harvester Company, Chicago, Ill., a corporation of Delaware
Filed Oct. 31, 1966, Ser. No. 590,785
2 Claims. (Cl. 198—64)

ABSTRACT OF THE DISCLOSURE

A two-stage grain conveyor having a first stage conveyor comprising a pair of augers, each of which is rotatably mounted in a feed tube; and a second stage conveyor comprising a single auger rotatably mounted in an elongate tube, the feed tubes are arranged in parallel to feed the elongate tube at spaced circumferential points, and the first stage augers are arranged in overlapping relation with the second stage auger.

---

This invention relates generally to grain conveyors. More particularly it is concerned with a two-stage auger elevator having a primary stage which delivers grain at a more fully rated capacity due to the force-feeding effect of feeding from a secondary stage comprising twin augers.

An important object of this invention is to provide an auger elevator which will convey grain at a greater capacity and with greater efficiency than conventional auger elevators.

Another object of this invention is to provide an auger elevator which will deliver grain more gently than will conventional auger elevators, resulting in less cracked and wasted grain.

Another object of this invention is to provide an auger elevator capable of operating at greater capacity at lower speeds than conventional auger elevators, thereby resulting in less wear for moving parts.

Another object of this invention is to provide an auger elevator of high efficiency due to use thereof of its increased capacity augers.

Another object of this invention is to provide an auger elevator of high efficiency and low cost due to the interchangeability of parts in the various stages thereof.

These and other objects of this invention will become apparent to those skilled in the art from the following specification taken in conjunction with the accompanying drawings wherein:

FIGURE 1 is a side elevational view of the two-stage auger elevator in position for use;

FIGURE 2 is an enlarged view taken along the line 2—2 of FIGURE 1 showing details of the secondary or feed stage comprising two augers;

FIGURE 3 is a sectional view taken along the line 3—3 of FIGURE 2 showing details of the primary and secondary stages; and FIGURE 4 is a view taken along the line 4—4 of FIGURE 3 showing details of the auger conveyor tubes.

The conventional auger elevator generally operates at approximately 50% of capacity. In order to make full use of the latent capacity of an auger elevator, it is constructed according to this invention in two stages. The primary or delivery stage operates at full rated capacity due to being forced-fed by a secondary or feed stage comprising twin augers of the same size as that used in the primary stage.

Turning now to the drawings, it will be seen that there is provided a conventional feed hopper 10. This feed hopper may be of any desired construction and may be supplied with grain from any desired source such as a suitable conveyor or a movable wagon or the like.

The two-stage auger elevator 12 is shown having a secondary or feed stage 14 which may be oriented to receive grain from feed hopper 10. Two-stage auger elevator 12 also has a primary or delivery stage 16 communicating with feed stage 14 and having a delivery spout 18 at the delivery end thereof for directing grain into a suitable silo or other storage device. Two-stage auger elevator 12 may be supported on suitable undercarriage 20 which in turn is carried by a rotatable means indicated by wheel support structure 22.

Delivery and feed stages 14 and 16 respectively include housing portions 24 and 25. Within housing portion 24 are mounted twin feed augers 28 of similar construction and capacity. Augers 28 are supported in suitable bearings 30 and 32 which serve as mounting and orienting means for insuring placement of augers 28 in parallel relationship so as to operate in unison and deliver equal amounts of grain. Augers 28 are formed about shaft 34 which extends through bearings 30 and 32 and which are rotated by means of suitable sprockets 36 driven by conventional means (not shown) at 38.

Housing portion 26 is elongated and provides support for delivery auger 40 formed on a shaft 42 which in turn is mounted in a pair of bearings, one of which is shown at 44. Rotation of auger 40 is effected by driving sprocket 46 which is suitably driven in turn through conventional means 38. Auger 40 is of the same size as twin augers 28 although elongated therefrom. By virtue of having augers of the same size, there is a relationship in the capacity of the primary and secondary stages.

Under normal conditions an auger will deliver approximately 50% of the volume of material which could be moved by the auger operating at full capacity within a housing formed to enclose an area of the same diameter. In order to insure that delivery auger 40 moves an increased amount of the grain which may be placed in its housing section 26, the twin augers 28, which are of the same size as auger 40, thus having double the capacity, so as to deliver to auger 40 as close to 100% of its capacity as is practical to provide. The twin feed augers in effect fully charge the delivery auger while operating at the same speed as the delivery auger. This accepted lower speed results in a gentle movement of grain from the hopper through the feed augers and the transfer area into the delivery stage of the elevator, resulting in less cracked and wasted grain than would be expected through the use of a single feed auger or an increased speed feed auger.

A particular advantage of using twin augers in the feed stage is that rim speed is considerably reduced over that which would be provided if a single auger were used. This reduces the physical impact of the rim upon the grain and considerably reduces centrifugal force which would otherwise act upon the grain to cause agitation and damage through cracking.

Thus it will be seen that this invention concerns an extremely simple and yet highly efficient auger elevator. It should be understood that various changes may be made in the form or details of the preferred embodiment of the auger elevator shown herein without departing from the scope of the invention.

What is claimed is:
1. A two-stage grain conveyor comprising:
   a primary tube having an outlet and an inlet formed in the periphery thereof;
   a delivery auger extending substantially through said primary tube presenting a portion opposite said inlet;
   a feed hopper;
   an elongate feed housing interconnecting said feed hopper and said primary tube, said feed housing including a plurality of feed tubes, each of said tubes extending generally parallel to said primary tube and terminating in an outlet in communication with said inlet of said primary tube;

a plurality of feed augers mounted in said feed housing, each of said augers being rotatable in an associated tube and each of said feed augers, respectively, extending substantially through one of said feed tubes and presenting a portion opposite said outlet, said portions of said feed augers being disposed above said portion of said delivery auger in a longitudinally overlapping relation, the axes of said feed augers being parallel to the axis of said delivery auger and circumferentially spaced about said delivery auger whereby one half of said feed augers is situated on one side of a vertical plane passing through the axis of said delivery auger, and the other half of said feed augers is situated on the opposite side of said plane; and means for driving said augers whereby grain is forcibly delivered to said primary tubular portion at a plurality of circumferentially spaced points.

2. A two-stage grain conveyor as recited in claim 1 wherein said plurality of feed augers comprises two augers arranged in side-by-side relation and situated on opposite sides of said plane, said feed augers and said delivery auger being of the same size, and said drive means includes means for driving said augers at the same speed.

References Cited

UNITED STATES PATENTS

| | | | |
|---|---|---|---|
| 587,640 | 8/1897 | Von Boyneburgk | 198—79 |
| 731,073 | 6/1903 | Rust | 198—79 |
| 1,570,085 | 1/1926 | Saxe | 198—64 X |
| 2,796,185 | 6/1957 | Bernstein | 198—213 X |
| 2,851,173 | 9/1958 | Morrison | 198—64 X |
| 2,960,320 | 11/1960 | Heider | 198—64 X |
| 2,988,203 | 6/1961 | Peterson | 198—213 |

EDWARD A. SROKA, *Primary Examiner.*

EVON C. BLUNK, *Examiner.*

M. L. AJEMAN, *Assistant Examiner.*